US011604725B2

(12) United States Patent
Basu (10) Patent No.: US 11,604,725 B2
(45) Date of Patent: Mar. 14, 2023

(54) MEMORY SUB-SYSTEM CODEWORD ADDRESSING

(71) Applicant: Micron Technology, Inc., Boise, ID (US)

(72) Inventor: Reshmi Basu, Boise, ID (US)

(73) Assignee: Micron Technology, INC., Boise, ID (US)

( * ) Notice: Subject to any disclaimer, the term of this patent is extended or adjusted under 35 U.S.C. 154(b) by 82 days.

(21) Appl. No.: 17/007,006

(22) Filed: Aug. 31, 2020

(65) Prior Publication Data

US 2022/0066920 A1 Mar. 3, 2022

(51) Int. Cl.
*G06F 12/02* (2006.01)
(52) U.S. Cl.
CPC ................................ *G06F 12/0223* (2013.01)
(58) Field of Classification Search
None
See application file for complete search history.

(56) References Cited

U.S. PATENT DOCUMENTS

| 3,996,961 | A | 12/1976 | Siegwart et al. | |
| 9,524,211 | B1 | 12/2016 | Segal et al. | |
| 9,666,225 | B2 | 5/2017 | Cideciyan et al. | |
| 9,711,234 | B1 | 7/2017 | Van Gaasbeck | |
| 10,468,112 | B1 * | 11/2019 | Eno | G11C 16/10 |
| 2020/0333974 | A1 * | 10/2020 | Basu | G06F 11/3037 |
| 2021/0072915 | A1 * | 3/2021 | Basu | G06F 3/0688 |

FOREIGN PATENT DOCUMENTS

WO WO-2013089715 A1 * 6/2013 ............. G06F 11/10

* cited by examiner

*Primary Examiner* — Charles Rones
*Assistant Examiner* — Ryan Dare
(74) *Attorney, Agent, or Firm* — Brooks, Cameron & Huebsch, PLLC (57) ABSTRACT

A hybrid addressing scheme in which a maximum of three codeword groups are utilized across pairs of memory dice and/or access rows of the memory sub-system or memory device is provided. By controlling the arrangement of such codewords, it can be possible to group codewords such that disturb effects can be reduced. For example, codewords can be grouped in a symmetrical manner with respect to the memory dice of a memory device, which can allow for simplified codeword addressing.

19 Claims, 5 Drawing Sheets

MEMORY SUB-SYSTEM CODEWORD ADDRESSING

TECHNICAL FIELD

Embodiments of the disclosure relate generally to memory sub-systems, and more specifically, relate to memory sub-system codeword addressing.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to memory sub-system codeword addressing, in particular to memory sub-systems that include a memory sub-system codeword addressing component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory devices (e.g., memory dice). Each die can consist of one or more planes. Planes can be grouped into logic units. For example, a non-volatile memory device can be assembled from multiple memory dice, which can each form a constituent portion of the memory device.

Data accesses invoking one or more codewords can be performed during operation of a memory sub-system. In general, a codeword can represent a smallest collection of data that can be individually protected by an error correction scheme and can typically represent a smallest allowed access unit (e.g., a smallest collection of data that can be written and/or read as a unit) associated with the memory sub-system.

During performance of a data access invoking one or more codewords, the accessed codewords can be written to, or read from, one or more partitions of the memory sub-system and/or memory device(s) associated with the memory sub-system. As used herein, a "partition," particularly with respect to a partition associated with a memory sub-system, generally refers to a contiguous set of storage locations (or physical address spaces) of a memory sub-system. In a non-limiting example, each memory die (or, in the alternative, each access row) of a memory sub-system, or memory device of a memory sub-system, can include sixteen (16) partitions that can each store 16-bytes of data. Accordingly, in some embodiments, a memory sub-system, or memory device of the memory sub-system, can be configured such that each of the 16 partitions can store 16-bytes of a codeword.

As discussed above, data accesses can invoke one or more codewords (e.g., multiple codewords can be written to, or read from, the memory sub-system or memory device concurrently). However, when data accesses invoking multiple codewords are performed, codewords (e.g., neighboring codewords) that are stored in memory die (or access row) above and/or below the memory die (or access row) in which the invoked codeword is stored can experience disturb effects, such as thermal disturbances, which can negatively impact the data integrity of the neighboring codewords.

In some approaches, codewords may be written across all partitions associated with each memory die of the memory sub-system or memory device. However, if all of the codewords are written across all the partitions associated with each memory die (e.g., a first codeword is written across 16 partitions of a first memory die, a second codeword is written across 16 partitions of a second memory die, a third codeword is written across 16 partition of a third memory die, etc.), writing of the codewords can cause the memory sub-system to experience adverse thermal conditions, such as overheating.

In order to mitigate the adverse effects of such approaches, some approaches limit the quantity of partitions that can be concurrently accessed within the memory sub-system or memory die. For example, some approaches can limit the quantity of partitions to ten (10) partitions that can be concurrently accessed (as opposed to, for example, sixteen (16) available partitions) to reduce disturb effects. However, such approaches can still suffer from undesirable overheating and/or disturb effects to neighboring codewords. In order to further mitigate the adverse effects of such approaches, some other approaches attempt to write codewords symmetrically across the memory dice (or access rows) of the memory sub-system or memory device.

For example, in some approaches that limit the quantity of partitions that can be accessed concurrently, the codewords can be written across partitions according to a hybrid address scheme in which multiple codewords are written across the partitions associated with each memory die of the memory sub-system or memory device. An illustrative example of scheme is an approach in which a first codeword is written across the first ten (10) partitions of the first memory die and a portion of a second codeword is written across the remaining six (6) partitions of the first memory die. The remainder of the second codeword is then written across the first four (4) partitions of the second memory die. A third codeword can be written across the next 10 partitions of the second memory die and a portion of a fourth codeword can be written the last two (2) partitions of the second memory die. The remainder of the fourth codeword can be written across the first eight (8) partitions of a third memory die and a fifth codeword can be written across the remaining 8 partitions of the third memory die and the remainder of the fifth codeword can be written across the first two (2) partitions of a fourth memory die. A sixth codeword can be written to the next 10 partitions of the fourth memory die and a portion of a seventh codeword can be written across the remaining four (4) partitions of the fourth memory die. Finally, the remainder of the seventh codeword can be written across the first six (6) partitions of a fifth memory die and an eight codeword can be written across the remaining 10 partitions of the fifth memory die.

Although such approaches can mitigate a portion of disturb effects that can negatively impact the data integrity of the codewords, hybrid address schemes such as this can still lead to situations where up to four neighboring codewords can be disturbed. In addition, addressing the codewords can become complex as, in the foregoing example, eight different offsets can be tracked for the eight different groups of codewords.

Aspects of the present disclosure address the above and other deficiencies by providing a hybrid addressing scheme in which a maximum of three codeword groups are utilized across pairs of memory dice and/or access rows of the memory sub-system or memory device. For purposes of the disclosure, the terms "memory die" or "memory dice" can, as appropriate to the context in which they are used, be used interchanged with the terms "row," "row access line," "access line," and/or "word line."

By controlling the arrangement of such codewords consistent with the disclosure, it can be possible to group codewords such that disturb effects can be further reduced in comparison to some approaches. Accordingly, embodiments described herein can allow for codewords to be written to a memory sub-system or memory device in concordance with addressing scheme that can allow for a reduction in disturb effects involving neighboring codewords within the memory sub-system or memory device. That is, in some embodiments, the codewords describe herein can be grouped in a symmetrical manner with respect to the memory dice of a memory device. This can allow simplify codeword addressing in comparison to some approaches and can mitigate thermal disturb effects, which can increase the endurance of the memory device thereby improving memory device reliability and life expectancy.

For example, in some embodiments, a codeword addressing scheme consistent with the disclosure can include writing a first codeword to a first set of contiguous partitions in a first memory die of a memory device, writing a portion of second codeword to a second set of contiguous partitions in the first memory die of the memory device, writing the remaining portion of the second codeword to a first set of contiguous partitions in a second memory die of the memory device; and writing a third codeword to a second set of contiguous partitions in the second memory die of the memory device. This can allow for disturb effects from neighboring codewords to be reduced to, at maximum, two codewords.

In addition, a partition that is devoid of a codeword or portion thereof (e.g., a "null partition"), can be provided between the first codeword and the portion of the second codeword and/or the remaining portion of the second codeword and the third codeword, as described in more detail, herein. For example, in order to utilize a quantity of available partitions associated with the memory sub-system or memory device while minimizing disturb effects inherent in some approaches, a "null partition" can be provided between one or more codewords in accordance with the codeword addressing schemes described herein. This can allow for disturb effects from neighboring codewords to be reduced to a single codeword.

Further, as a result of the novel codeword layout schemes described herein, a thermal disturb count may not be incremented or increased when a memory block is only partially affected by a codeword being written to a neighboring memory location. For example, a thermal disturb count associated with the codeword 236 illustrated in FIG. 2, herein may not be increased or incremented in response to the codeword 238 shown in FIG. 2 being written to the memory die or memory device because only a portion (e.g., half) of the codeword 236 is affected by the codeword 238 being written to the memory die or memory device.

Moreover, by employing the codeword layout schemes described herein, the complexity of firmware or other control instructions necessitated to manage reading and writing of the codewords can be substantially simplified in comparison to some approaches. For example, in approaches such as the approach described above in which the codewords are written across each of the partitions associated with each memory die of the memory sub-system or memory device, multiple offsets must be recorded and tracked to facilitate reading and writing of the codewords due to the complexity of the overall addressing scheme. In contrast, embodiments herein can reduce the quantity of offsets that are recorded and tracked because the codewords can essentially have one of only two or three starting addresses within a memory die.

Figure 1:
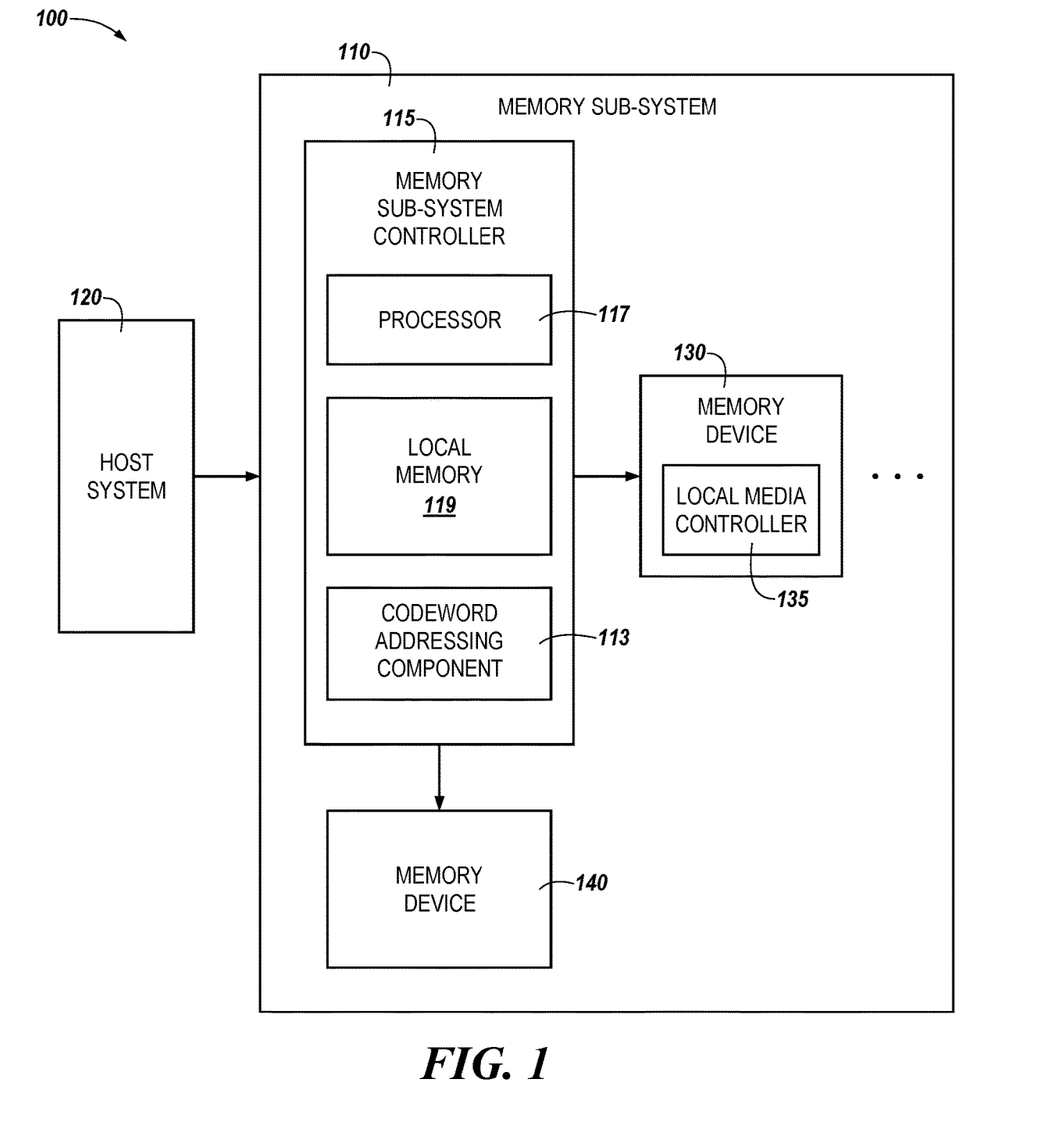
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a codeword addressing component. Although not shown in FIG. 1 so as to not obfuscate the drawings, the codeword addressing component 113 can include various circuitry to facilitate and/or orchestrate addressing of accesses for a memory sub-system and/or components of the memory sub-system according to the hybrid addressing schemes described herein. In some embodiments, the codeword addressing component 113 can track offsets for codewords written to the memory sub-system to ensure accurate storage and retrieval of the codewords from the memory sub-system. Further, in some embodiments, the codeword addressing component 113 can control data accesses to the memory sub-system to mitigate disturb effects to neighboring codewords. The codeword addressing component 113 can include special purpose circuitry in the form of an ASIC, FPGA, state machine, and/or other logic circuitry that can allow the codeword addressing component 113 to orchestrate and/or perform operations to selectively control access to codewords written to the memory device 130 and/or the memory device 140 based on the hybrid addressing schemes described herein.

In some embodiments, the memory sub-system controller 115 includes at least a portion of the codeword addressing component 113. For example, the memory sub-system controller 115 can include a processor 117 (processing device) configured to execute instructions stored in local memory 119 for performing the operations described herein. In some embodiments, the codeword addressing component 113 is part of the host system 110, an application, or an operating system.

In a non-limiting example, the memory addressing component 113 can cause a first codeword (e.g., the codeword 232 illustrated in FIG. 2, herein) to be written to a first set of contiguous partitions (e.g., the contiguous partitions 235-1 illustrated in FIG. 2, herein) in a first access row (e.g., the row or memory die 233-1 illustrated in FIG. 2, herein) of a memory device 130 and cause a first portion of a second codeword (e.g., the codeword 236 illustrated in FIG. 2, herein) to be written to a second set of contiguous partitions (e.g., the contiguous partitions 235-2 illustrated in FIG. 2, herein) in the access first row of the memory device 130. In some embodiments, the first set of contiguous partitions in the first access row and the second set of contiguous partitions in the first access row can be separated by a null partition (e.g., the null partition 234-1 illustrated in FIG. 2, herein).

The memory addressing component 113 can cause a second portion of the second codeword to be written to a first set of contiguous partitions (e.g., the contiguous partitions 235-3 illustrated in FIG. 2, herein) in a second access row (e.g., the row or memory die 233-N illustrated in FIG. 2, herein) of the memory device 130, and can cause a third codeword (e.g., the codeword 236 illustrated in FIG. 2, herein) to be written to a second set of contiguous partitions (e.g., the contiguous partitions 235-4 illustrated in FIG. 2, herein) in the second access row of the memory device 130. In some embodiments, each of the first, second, and third codewords can contain an amount of data that corresponds to a smallest access size of the memory device 130. Further, in some embodiments, the first set of contiguous partitions in the second access row and the second set of contiguous partitions in the second access row can be separated by a null partition (e.g., the null partition 234-X illustrated in FIG. 2, herein).

Continuing with this example, the codeword addressing component 113 can cause performance of a media management operation as part of writing the first codeword, the second codeword, and/or the third codeword. For example, the codeword addressing component 113 can cause performance of a media management operation to mitigate disturb effects as part of writing the codewords to the respective contiguous partitions described above. In some embodiments, the operation to mitigate disturb effects can include operations to mitigate thermal disturb effects by writing the codewords to the contiguous partitions according to the hybrid addressing schemes described herein.

The codeword addressing component 113 can determine a quantity of partitions in the first set of contiguous partitions or the third set of contiguous partitions, or both, based, at least in part, on a requested quantity of hybrid access rows. For example, in response to determining a quantity of memory dice and/or address rows associated with the memory device 130 and a quantity of desired hybrid access rows to store codewords, the codeword addressing component 113 can determine the quantity of partitions to associate to each of the first set, the second set, and the third set of contiguous partitions. Embodiments are not so limited, and, in some embodiments, the codeword addressing component 113 can determine a total quantity of codewords to be written to the memory device 130 based, at least in part, on a total package size (e.g., an area that bounds the memory device 130 corresponding to the memory device 130 and a requested quantity of hybrid access rows. Further, as described in more detail in connection with FIG. 2 and FIG.

Figure 3:
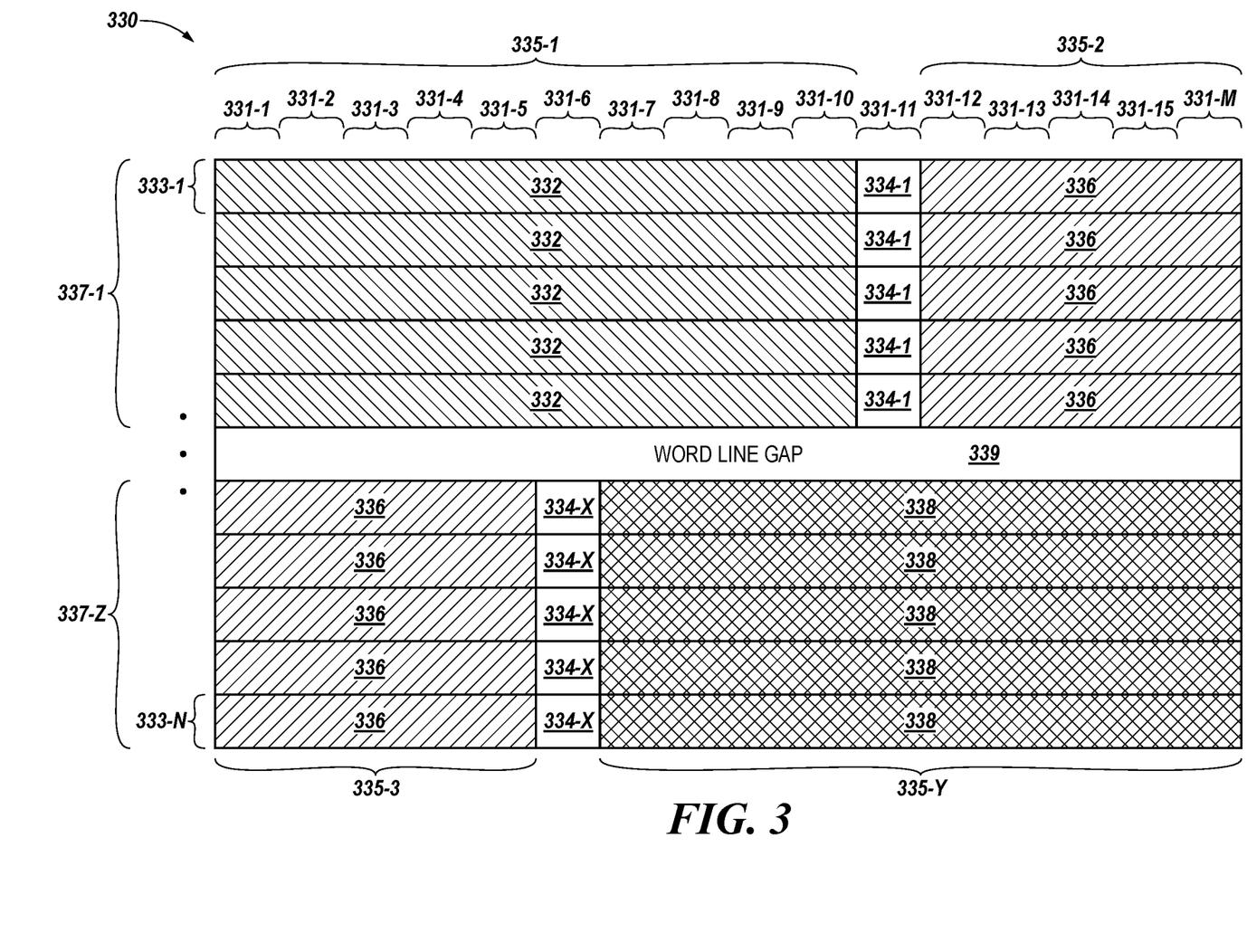
FIG. 3 illustrates another example memory device in accordance with some embodiments of the present disclosure.

3, herein each hybrid access row can have a quantity of addressable storage locations in a particular row of the memory device associated therewith.

Figure 2:
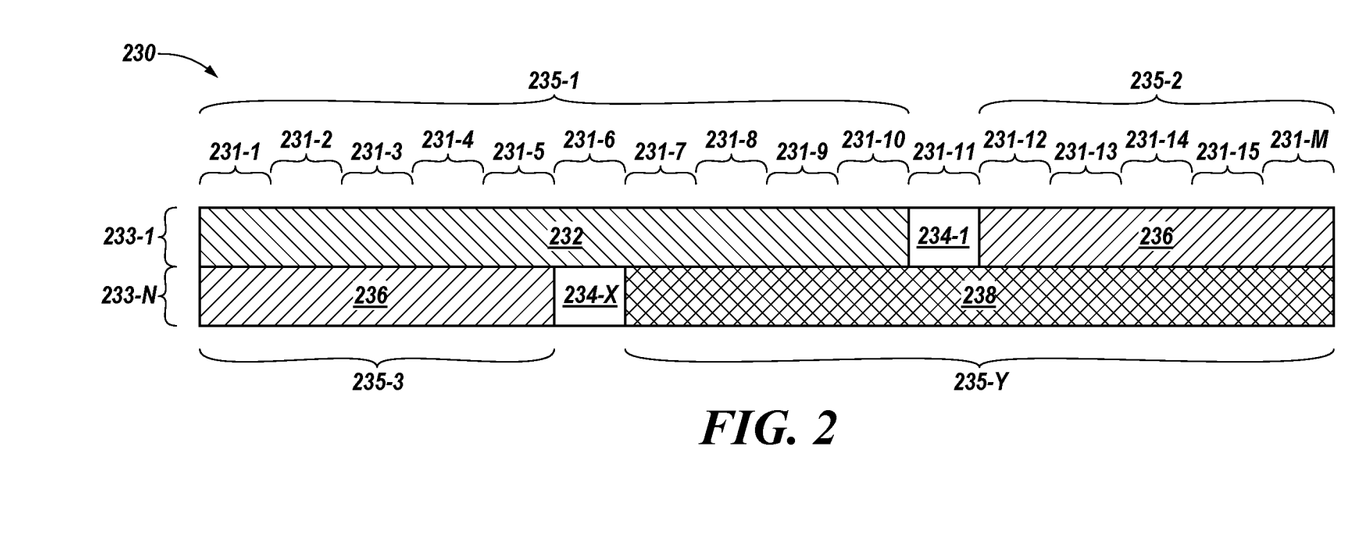
FIG. 2 illustrates an example memory device in accordance with some embodiments of the present disclosure.

FIG. 2 illustrates an example memory device 230 in accordance with some embodiments of the present disclosure. The memory device 230 can be analogous to the memory device 130 illustrated in FIG. 1. As shown in FIG. 2, the memory device 230 can include multiple memory dice (or access rows) 233-1 to 233-N. Each of the memory dice 233-1 to 233-N can include multiple partitions 231-1 to 231-M that can be subdivided into various contiguous portions 235-1 to 235-Y. As discussed above, each of the partitions 231-1 to 231-M can store a codeword 232, 236, 238, etc. and/or a portion of a codeword 232, 236, 238, etc. In some embodiments, one or more of the partitions 231-1 to 231-M can be designated as a null partition 234-1 to 234-X. As used herein, a "null partition" generally refers to a partition 231-1 to 231-M of the memory device 230 that is devoid of data. For example, the null partitions 234-1 to 234-X can be partitions in which no codewords or portions of codewords are stored.

As shown in FIG. 2, the memory device 230 is divided into multiple partitions 231-1 to 231-M along a horizontal axis with respect to the page and into multiple access rows (or dice) 233-1 to 233-N along a vertical axis with respect to the page. Each of the partitions 231-1 to 231-M can store data corresponding to a codeword 232, 236, and/or 238. In the first access row 233-1, a first codeword 232 can be written to a set of contiguous partitions 235-1. A portion of a second codeword 236 can be written to a different set of contiguous partitions 235-2. A null partition 234-1 can be provided between the first set of contiguous partitions 235-1 and the second set of contiguous partitions 235-2. The null partition 234-1 can be provided to reduce disturb effects, such as thermal disturb effects, between the first codeword 232 and the portion of the second codeword 236.

In the second access row 233-N the remainder of the second codeword 236 can be written to a set of contiguous partitions 235-3. A third codeword 238 can be written to a different set of contiguous partitions 235-4 along the access row 233-N. A null partition 234-X can be provided between the set of contiguous partitions 235-3 and the set of contiguous partitions 235-4. The null partition 234-4 can be provided to reduce disturb effects, such as thermal disturb effects, between the portion of the second codeword 236 and the third codeword 238.

Because each codeword has, at most, two neighboring codewords (e.g., the codeword 232 has the portion of the second codeword 236 and a portion of the third codeword 238 in the access row 233-N as neighbors), disturb effects can be reduced in comparison to the approaches described above. Further, in some embodiments, it can be possible to refrain from updating a disturb count for a codeword that is only "partially affected," which can simply media management operations for the memory device 230. Moreover, by arranging the codewords 232, 236, and/or 238 as shown in FIG. 2, the performance of the memory device 230 can be increased in comparison to the approaches described above at least because codeword refresh tasks can be performed less frequently than in some approaches.

In a non-limiting example, a memory sub-system (e.g., the memory sub-system 110 illustrated in FIG. 1, herein) can include one or more memory devices 230 that are arranged to form a stackable cross-gridded array of memory cells. The memory sub-system can include a processing device (e.g., the codeword addressing component 113 illustrated in FIG. 1, herein) that can perform various operations. In some embodiments, the processing device can perform operations that include determining a quantity of addressable partitions 231-1 to 231-M in a first hybrid address row 233-1 of a particular memory device 230 and a quantity of addressable partitions 233-1 to 233-M in a second hybrid address row 233-N of the memory device 230.

The processing device can further perform operations that include writing a first codeword 232 to the first set of contiguous partitions 235-1 in the first hybrid access row of the particular memory device 230, writing a first portion of a second codeword 236 to a second set of contiguous partitions 235-2 in the first hybrid access row of the particular memory device 230, writing a second portion of the second codeword to a first set of contiguous partitions 235-3 in the second hybrid access row 233-N of the memory device 230, and/or writing a third codeword 238 to a second set of contiguous partitions 235-Y in the second hybrid access row 233-N of the memory device 230. The first codeword 232, the second codeword 236, and/or the third codeword 238 can contain an amount of data that corresponds to a smallest access size of the particular memory device 230 (e.g., an access unit). In some embodiments, writing to the first set of contiguous portions 235-1 and the second set of contiguous partitions 235-2 of the first hybrid access row 233-1 or the first set of contiguous portions 235-3 and the second set of contiguous partitions 235-Y of the second hybrid access row 233-N, or both, can be based, at least in part, on the determined quantity of addressable partitions in the first hybrid address row 233-1 of the memory device and the quantity of addressable partitions in the second hybrid address row 233-N of the memory device 230.

In some embodiments, a quantity of partitions 231-1 to 231-M in the first set of contiguous partitions 235-1 in the first row 233-1 can be substantially equal to a quantity of partitions 231-1 to 231-M in the second set of contiguous partitions 235-Y in the second row 233-N. Further, as described in more detail in connection with FIG. 3, herein, a quantity of partitions 233-1 to 233-M associated with first set of contiguous partitions 235-1 in the first hybrid access row 233-1 or the second set of contiguous partitions 235-Y in the second hybrid access row 233-N, or both, can be based on an area that bounds the particular memory device 230. For example, a package size of the particular memory device 230 can dictate a quantity of partitions 231-1 to 231-M that are associated with the first, second, and/or third set of contiguous partitions 235-1 to 235-Y in the first and/or second hybrid access row 233-1 to 233-N of the memory device 230. Further, as described in more detail in connection with FIG. 2 and FIG. 3, herein, first set of contiguous partitions 235-1 in the first row 233-1 and the second set of contiguous partitions 235-2 in the first row 233-1 or the first set of contiguous partitions 235-3 in the second row 233-N and the second set of contiguous partitions 235-Y in the second row 233-N, or both, can be separated by a null partition 234-1 to 234-X.

As described above, the processing device can cause performance of a media management operation as part of writing the first codeword 232, the second codeword 236, and/or the third codeword 238. For example, the processing device can perform operations including performing a media management operation to mitigate disturb effects as part of writing the codewords to the respective contiguous partitions 235-1 to 235-Y described above. In some embodiments, the operation to mitigate disturb effects can include operations to mitigate thermal disturb effects by writing the codewords 232, 236, 238 to the contiguous partitions 235-1 to 235-Y according to the hybrid addressing schemes described herein.

FIG. 3 illustrates another example memory device 330 in accordance with some embodiments of the present disclosure. The memory device 330 can be analogous to the memory device 130 illustrated in FIG. 1 and/or the memory device 230 illustrated in FIG. 2. As shown in FIG. 3, the memory device 330 can include multiple portions 337-1 to 337-Z of memory dice (or access rows) 333-1 to 333-N. As shown in FIG. 3, the portions 337-1 to 337-Z of the memory die can be separated by a word line gap 339. As used herein, a "word line gap" generally refers to an area that is substantially equal to the width of a row access line that does not include access circuitry. By providing the word line gap 339 between the two portions of the memory package, it can be possible to further mitigate disturb effects between neighboring codewords by further reducing a quantity of neighboring codewords that are in close physical contact with one another.

In some embodiments, each of the portions 337-1 to 337-Z of the memory dice 333-1 to 333-N can include multiple partitions 331-1 to 331-M. The portions 337-1 to 337-Z of the memory device can each constitute a percentage of the total area (e.g., the package size) of the memory device 330. In the embodiments shown in FIG. 3, in which there are two distinct portions 337-1 to 337-Z illustrated, the portion 337-1 can have an area that is one half of the total area bounding the memory device 330 while the portion 337-Z can have an area that is one half of the total area bounding the memory device 330, although embodiments are not so limited.

As described in FIG. 2, the partitions 331-1 to 331-M can be subdivided into various contiguous portions 335-1 to 335-Y of partitions 331-1 to 331-M. As discussed above, each of the partitions 331-1 to 331-M can store a codeword 332, 336, 338, etc. and/or a portion of a codeword 332, 336, 338, etc. In some embodiments, one or more of the partitions 331-1 to 331-M can be designated as a null partition 334-1 to 334-X.

Figure 4:
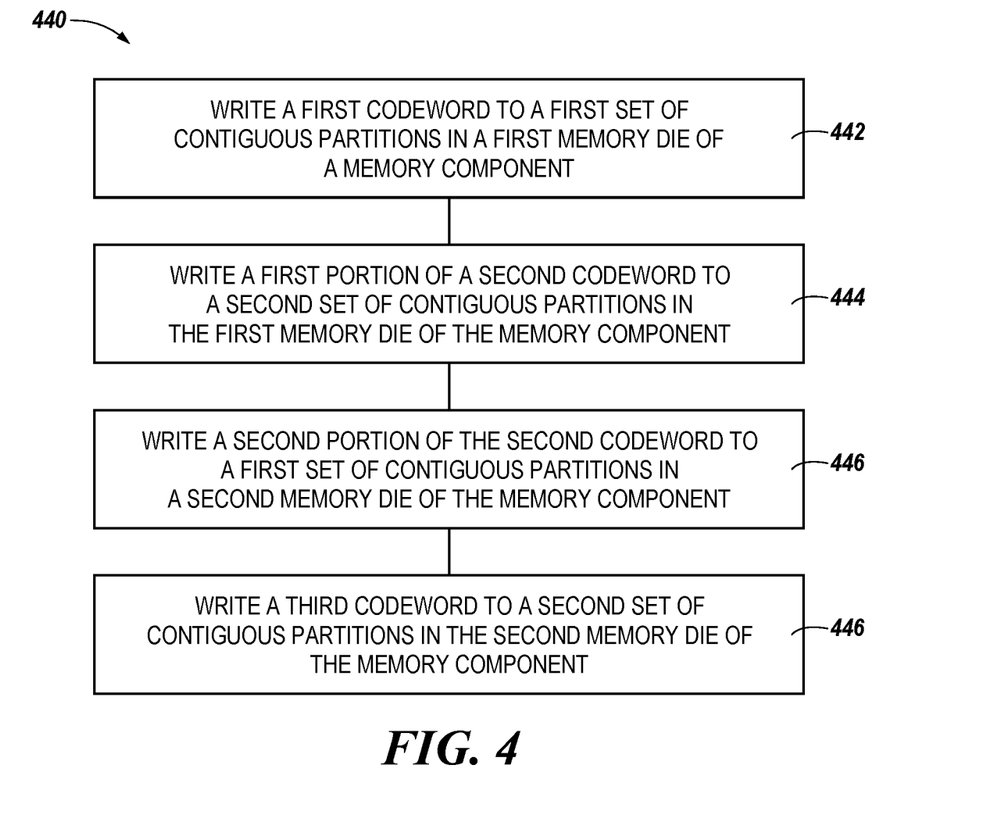
FIG. 4 is a flow diagram corresponding to a method for memory sub-system codeword addressing in accordance with some embodiments of the present disclosure.

FIG. 4 is a flow diagram corresponding to a method 440 for memory sub-system codeword addressing in accordance with some embodiments of the present. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the codeword addressing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 442, a first codeword (e.g., the codeword 232 illustrated in FIG. 2, herein) is written to a first set of contiguous partitions (e.g., the contiguous partitions 235-1 illustrated in FIG. 2, herein) in a first memory die (e.g., the memory die or row 233-1 illustrated in FIG. 2, herein) of a memory device (e.g., the memory device 130 illustrated in FIG. 1, herein).

At operation 444, a first portion of a second codeword (e.g., the codeword 236 illustrated in FIG. 2, herein) is written to a second set of contiguous partitions (e.g., the contiguous partitions 235-2 illustrated in FIG. 2, herein) in the first memory die of the memory device.

At operation 446, a second portion of the second codeword (e.g., the codewords 236 illustrated in FIG. 2, herein) is written to a first set of contiguous partitions (e.g., the contiguous partitions 235-3 illustrated in FIG. 2, herein) in a second memory die (e.g., the memory die or row 233-N illustrated in FIG. 2, herein) of the memory device.

At operation 448, a third codeword (e.g., the codeword 238 illustrated in FIG. 2, herein) is written to a second set of contiguous partitions (e.g., the contiguous partitions 235-4 illustrated in FIG. 2, herein) in the second memory die of the memory device. As described above, a quantity of partitions in the first set of contiguous partitions in the first memory die can be substantially equal to a quantity of partitions in the second set of contiguous partitions in the second memory die. As used herein, the term "substantially" intends that the characteristic needs not be absolute, but is close enough so as to achieve the advantages of the characteristic. For example, "substantially equal" is not limited to scenarios in which two quantities are absolutely equal and can include quantities that are intended to be equal but due to manufacturing limitations may not be precisely equal.

In some embodiments, there can be a null partition (e.g., the null partition 234-1 illustrated in FIG. 2, herein) between the null partition 234-1 illustrated in FIG. 2, herein) between the first set of contiguous partitions in the first memory die and the second set of contiguous partitions in the first memory die. Similarly, in some embodiments, there can be a null partition (e.g., the null partition 234-N illustrated in FIG. 2, herein) between the first set of contiguous partitions in the second memory die and the second set of contiguous partitions in the second memory die.

The method 440 can include writing the second of codeword such that a quantity of data in the first portion of the second of codeword is substantially equal to a quantity of data in the second portion of the second of codeword. Further, as described above, the first memory die can be disposed on a first portion corresponding to one half of an area associated with the memory device and/or the second memory die can be disposed on a second portion corresponding to one half of the area associated with the memory device. Further, the first portion and the second portion can be separated by a word line gap (e.g., the word line gap 339 illustrated in FIG. 3, herein).

In some embodiments, the method 440 can include determining a quantity of partitions in the first set of contiguous partitions, the second set of contiguous partitions, and/or the third set of contiguous partitions, based, at least in part, on a requested quantity of hybrid access rows for each memory die. As described above, each hybrid access row can correspond to a quantity of addressable storage locations in a particular memory die of the memory device.

Figure 5:
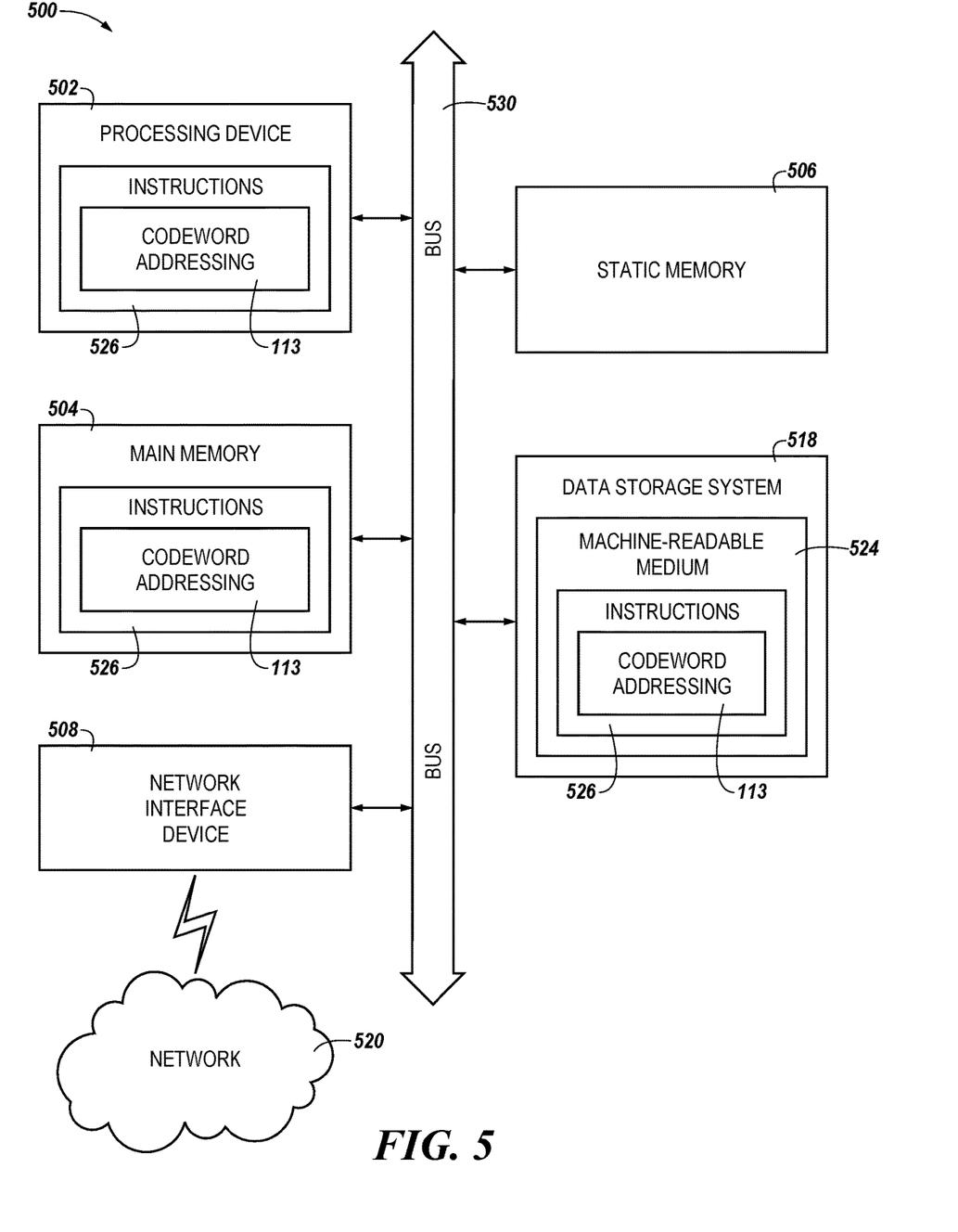
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the codeword addressing component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a codeword addressing component (e.g., the codeword addressing component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    writing a first codeword to a first set of contiguous partitions in a first memory die of a memory device;
    writing a first portion of a second codeword to a second set of contiguous partitions in the first memory die of the memory device, wherein:
        the first portion comprises a first half of the second codeword, and
        a null partition is provided between the first set of contiguous partitions and the second set of contiguous partitions such that a last partition in the first set of contiguous partitions is physically adjacent to the null partition and a first partition in the second set of contiguous partitions is physically adjacent to the null partition;
    writing a second portion of the second codeword to a first set of contiguous partitions in a second memory die of the memory device, wherein the second portion comprises a second half of the second codeword; and
    writing a third codeword to a second set of contiguous partitions in the second memory die of the memory device.

2. The method of claim 1, wherein there is a null partition between the first set of contiguous partitions in the second memory die and the second set of contiguous partitions in the second memory die.

3. The method of claim 1, further comprising writing the second codeword such that a quantity of data in the first portion of the second codeword is equal to a quantity of data in the second portion of the second codeword.

4. The method of claim 1, wherein a quantity of partitions in the first set of contiguous partitions in the first memory die is equal to a quantity of partitions in the second set of contiguous partitions in the second memory die.

5. The method of claim 1, wherein the first memory die is disposed on a first portion corresponding to one half of an area associated with the memory device and wherein the second memory die is disposed on a second portion corresponding to one half of the area associated with the memory device, and wherein the first portion and the second portion are separated by a word line gap.

6. The method of claim 1, further comprising determining a quantity of partitions in the first set of contiguous partitions, the second set of contiguous partitions, or the third set of contiguous partitions, or combinations thereof, based, at least in part, on a requested quantity of hybrid access rows for each memory die,
    wherein each hybrid access row corresponds to a quantity of addressable storage locations in a particular memory die of the memory device.

7. An apparatus, comprising:
    a memory sub-system codeword addressing component to:
        write a first codeword to a first set of contiguous partitions in a first access row of a memory device;
        write a first half of a second codeword to a second set of contiguous partitions in the first access row of the memory device, wherein:
            the first set of contiguous partitions in the first access row and the second set of contiguous partitions in the access first row are separated by a null partition, and
            a last partition in the first set of contiguous partitions is physically adjacent to the null partition and a first partition in the second set of contiguous partitions is physically adjacent to the null partition;
        write a second half of the second codeword to a first set of contiguous partitions in a second access row of the memory device; and
        write a third codeword to a second set of contiguous partitions in the second access row of the memory device.

8. The apparatus of claim 7, wherein the first set of contiguous partitions in the second access row and the second set of contiguous partitions in the second access row are separated by a null partition.

9. The apparatus of claim 7, wherein the memory sub-system codeword addressing component is to cause performance of a media management operation as part of writing the first codeword, the second codeword, or the third codeword or any combination thereof.

10. The apparatus of claim 7, wherein the memory sub-system codeword addressing component is to determine a quantity of partitions in the first set of contiguous partitions or the third set of contiguous partitions, or both, based, at least in part, on a requested quantity of hybrid access rows,
    wherein each hybrid access row has a quantity of addressable storage locations in a particular row of the memory device associated therewith.

11. The apparatus of claim 7, wherein the memory sub-system codeword addressing component is to determine a total quantity of codewords to be written to the memory device based, at least in part, on a package size corresponding to the memory device and a requested quantity of hybrid access rows,
    wherein each hybrid access row has a quantity of addressable storage locations in a particular row of the memory device associated therewith.

12. The apparatus of claim 7, wherein the first codeword, the second codeword, and the third codeword each contain an amount of data that corresponds to a smallest access size of the memory device.

13. A system, comprising:
    a memory sub-system comprising a plurality of memory devices arranged to form a stackable cross-gridded array of memory cells; and
    a processing device coupled to the plurality of memory devices, the processing device to perform operations comprising:
        determining a quantity of addressable partitions in a first hybrid address row of a memory device and a quantity of addressable partitions in a second hybrid address row of the memory device;
        writing a first codeword to the first set of contiguous partitions in the first hybrid access row of the particular memory device;
        writing a first half of a second codeword to a second set of contiguous partitions in the first hybrid access row of the particular memory device, wherein a null partition is provided between the first set of contiguous partitions and the second set of contiguous partitions such that a last partition in the first set of contiguous partitions is physically adjacent to the null partition and a first partition in the second set of contiguous partitions is physically adjacent to the null partition;

writing a second half of the second codeword to a first set of contiguous partitions in the second hybrid access row of the memory device; and writing a third codeword to a second set of contiguous partitions in the second hybrid access row of the memory device, wherein writing to the first set of contiguous portions and the second set of contiguous partitions of the first hybrid access row or the first set of contiguous portions and the second set of contiguous partitions of the second hybrid access row, or both, is based, at least in part, on the determined quantity of addressable partitions in the first hybrid address row of the particular memory device and the quantity of addressable partitions in the second hybrid address row of the particular memory device.

14. The system of claim 13, wherein a quantity of partitions associated with first set of contiguous partitions in the first hybrid access row or the second set of contiguous partitions in the second hybrid access row, or both, is based on an area that bounds the particular memory device.

15. The system of claim 13, wherein the first set of contiguous partitions in the second row and the second set of contiguous partitions in the second row are separated by a null partition.

16. The system of claim 13, wherein each of the first codeword, the second codeword, and the third codeword contains an amount of data that corresponds to a smallest access size of the particular memory device.

17. The system of claim 13, wherein the processing device is to perform operations comprising controlling performance of a media management operation as part of writing the first codewords, the second codeword, or the third codewords or any combination thereof.

18. The system of claim 13, wherein a quantity of partitions in the first set of contiguous partitions in the first row to which the first half of the second codeword is written is equal to a quantity of partitions in the second set of contiguous partitions in the second row to which the second half of the second codeword is written.

19. The system of claim 13, wherein the first row is disposed on a first portion corresponding to one half of an area bounding the particular memory device and wherein the second row is disposed on a second portion corresponding to one half of the area bounding the particular memory device.

* * * * *